United States Patent [19]

Smith et al.

[11] B 4,026,862

[45] May 31, 1977

[54] CARBOXYLIC ACID STORAGE STABILIZERS FOR LATENT CATALYST CURED EPOXY RESINS

[75] Inventors: James D. B. Smith, Turtle Creek; Robert N. Kauffman, Monroeville, both of Pa.

[73] Assignee: Westinghouse Electric Corporation, Pittsburgh, Pa.

[22] Filed: Feb. 11, 1974

[21] Appl. No.: 441,605

[44] Published under the second Trial Voluntary Protest Program on February 3, 1976 as document No. B 441,605.

[52] U.S. Cl. .................. 260/37 EP; 260/18 PF; 260/47 EA; 260/59 EP; 260/78.41; 260/830 TW; 336/96; 428/263

[51] Int. Cl.² ............... C08G 51/04; C08G 30/12

[58] Field of Search ............. 260/78.4 EP, 47 EC, 260/2 EC, 59, 48.85, 830 TW, 18 EP, 37 EP; 336/96

[56] References Cited

UNITED STATES PATENTS

| 2,844,552 | 7/1958 | Glaser | 260/2 EC |
| 2,928,807 | 3/1960 | Belanger | 260/47 |
| 2,928,809 | 3/1960 | Hicks | 260/2 X |
| 2,934,506 | 4/1960 | Hicks et al | 260/18 |
| 3,678,004 | 7/1972 | Meyers | 260/47 |

Primary Examiner—Lewis T. Jacobs
Assistant Examiner—T. Pertilla
Attorney, Agent, or Firm—D. P. Cillo

[57] ABSTRACT

A resinous composition, suitable for insulating electrical members, is made from a mixture containing about 100 parts of an epoxy resin, about 55 to 165 parts of an acid anhydride, an effective amount of a latent catalyst and about 1 to 20 parts of a carboxylic acid stabilizer selected from the group of acetic, propionic, butyric, isobutyric, valeric, caproic, and heptanoic acids. acids.

13 Claims, 1 Drawing Figure

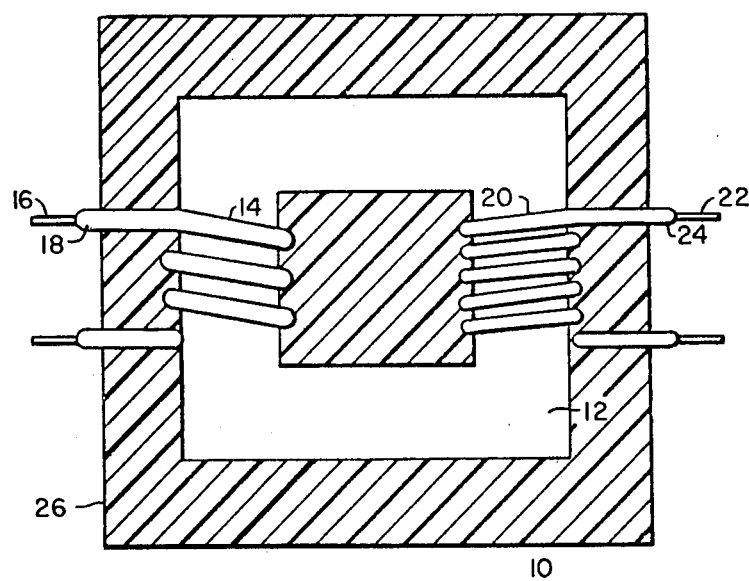

CARBOXYLIC ACID STORAGE STABILIZERS FOR LATENT CATALYST CURED EPOXY RESINS

BACKGROUND OF THE INVENTION

To improve high temperature stability over amine cured epoxy resin systems and to give better physical and electrical properties, it has been the general practice in the epoxy technological field to use anhydride curing agents with epoxy resins. Most anhydride formulations require elevated-temperature cures, and for most commercial applications, it is necessary to add some form of catalyst to speed the rate of cure. The catalyst is preferably a latent catalyst which would provide rapid cure of the epoxy resin at about 135°-180°C, and yet not harm the storage life of the resin. In practice, the viscosity of the resin should not increase over about 1000 cp at room temperature after periods of one to several months.

Several latent catalysts have appeared on the commercial scene in recent years. Included are benzyldimethylamine, methyl imidazole, stannous octoate, benzyldimethyl aniline, "extra-coordinate" siliconate salts, triethanolamine borate, triethanolamine titanate and various other metal chelates. These type catalysts provide very fast gel times and are particularly suitable for potting compositions employing less reactive epoxy resins such as aliphatic epoxides. Other type catalysts, more suitable for impregnating varnishes made from bisphenol A or novolac epoxies, would include quaternary ammonium halides such as benzyltrimethylammonium chloride. Dante et al., U.S. Pat. No. 3,547,885, taught improved latent catalysts in the form of tetraphosphonium halide catalysts for aromatic and aliphatic dicarboxylic acid cured epoxy systems and Smith, in U.S. Pat. No. 3,784,583, assigned to the assignee of this invention, taught quaternary organic phosphonium propionates, acetates, butyrates, isobutyrates and dimethyl phosphates as particularly effective latent catalysts for anhydride cured epoxy systems.

All of these latent catalysts, while providing good gel times, leave much to be desired in terms of storage properties for the epoxy-anhydride system. What is needed is a non-catalytic chemical stabilizer, that can be used with the latent catalyzed epoxy-anhydride system, which would improve the pot life of the system.

SUMMARY OF THE INVENTION

It has been discovered that an effective amount of a limited class of carboxylic acids will behave as chemical stabilizers for latent catalyzed epoxy resins, when used with an acid anhydride. The effective weight ratio of epoxy resin:acid anhydride:carboxylic acid is 100:55 to 165:1.0 to 20.0.

Very good storage properties at ambient temperatures have been found, consequently, long life one-component resin formulations employing these stabilizers are possible. Gel times remain effectively low and electrical measurements on the cured system show relatively low dielectric constants and power factors at temperatures of 125°C.

BRIEF DESCRIPTION OF THE DRAWING

For a better understanding of the invention, reference may be made to the preferred embodiments, exemplary of the invention, shown in the accompanying drawing which is a vertical sectional view through a transformer.

DESCRIPTION OF THE PREFERRED EMBODIMENTS

Quarternary ammonium and phosphonium salts are particularly effective latent catalysts for the anhydride cure of epoxy casting compositions used in encapsulating electrical devices. At concentrations of about 0.02 to 0.70 parts quaternary onium salt per 100 parts epoxy resin, rapid gel times in the temperature range of 135° to 170°C are possible. The term "latent catalyst" is taken to mean the ability of a compound to speed up curing rates at temperatures over 100°C while exhibiting minimal cure at room temperature.

The quaternary onium salt compounds that are particularly effective have the general structural formula:

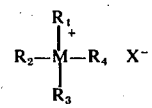

where M can be an ion such as, for example, N or P, to provide ammonium and phosphonium compounds, $R_1$, $R_2$, $R_3$ and $R_4$ are aryl radicals or alkyl radicals having 1 to 21 carbon atoms, with preferred alkyl radicals having 4 to 12 carbons. X, bonded to the onium atom, is a halogen, preferably Cl, Br or I, but preferably is a propionate, acetate, butyrate, isobutyrate or dimethylphosphate radical.

The effective weight percent range of ingredients, to provide a good compromise of cure time, and electrical and mechanical properties, is an epoxy resin:acid anhydride:quaternary organic onium salt ratio of 100:55 to 165:0.02 to 0.70, with a preferred range of about 100:55 to 165:0.05 to 0.30 respectively. Some examples of suitable quaternary onium salts which may be used alone or in admixtures would include, for example, benzyltrimethylammonium iodide, benzyltriethylammonium chloride, tetrabutyl phosphonium chloride, tetrabutyl phosphonium bromide, triphenylethyl phosphonium iodide, tetrabutyl phosphonium acetate, methyltrioctylphosphonium dimethyl phosphate and methyltriphenylphosphonium dimethyl phosphate, among others.

Other latent catalysts may be used for the anhydride cure of the epoxy casting compositions of this invention. Particularly effective amines and imidazoles include, for example, N,N-benzyldimethylamine, N,N-benzyldiethyl amine, triethanolamine, triethylamine, dimethylaniline, diethylaminopropylamine, pyridine, piperidine, triethanolamine borate (amine complex), trisdimethylaminomethylphenol (amine substituted phenol), 2-methylimidazole, 2-ethyl-4 methyl imidazole and 1-methylimidazole. These catalysts are not as latent as the onium salts, and should be used at lower concentrations of about 0.05 to 0.3 parts per 100 parts epoxy resin, in order to effectively cure. These catalysts are particularly effective with less reactive epoxy resins such as aliphatic epoxides, for use in electrical transformer coil casting compositions, where viscosity considerations are not as critical as in impregnating varnish compositions. An aliphatic resin based system could provide a very cheap potting compound since it would have good permeation properties when mixed with a filler such as sand.

The glycidyl polyether of a dihydric phenol which may be employed in the invention is obtainable by reacting epichlorhydrin with a dihydric phenol in an alkaline medium at about 50°C, using 1 to 2 or more moles of epichlorhydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the formula:

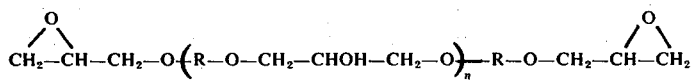

where $n$ is an integer of the series 0, 1, 2, 3 ..., and R represents the divalent hydrocarbon radical of the dihydric phenol. The glycidyl polyethers of a dihydric phenol used in the invention have a 1, 2 epoxy equivalency between 1.0 and 2.0. By the epoxy equivalency, reference is made to the average number of 1, 2 epoxy groups,

contained in the average molecule of the glycidyl ether. Preferably in the formula above, R is:

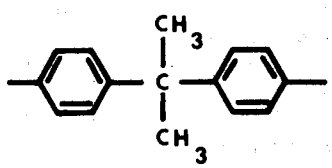

and these glycidyl polyethers are commonly called bisphenol A type epoxy resins. Bisphenol A (p, p - dihydroxy-diphenyldimethyl methane) is the dihydric phenol used in these epoxides.

Typical epoxy resins of bisphenol A are readily available in commercial quantities and reference may be made to the *Handbook of Epoxy Resins* by Lee and Neville for a complete description of their synthesis or to U.S. Pat. Nos.: 2,324,483; 2,444,333; 2,500,600; 2,511,913; 2,558,949; 2,582,985; 2,615,007; and 2,633,458. Other epoxy resins that are useful in this invention and which can be used in place of or mixed with the bisphenol A type epoxy resins include aliphatic epoxy resins, cycloaliphatic epoxy resins and polyglycidyl ethers of a novolac. Reference may be made to *Plastic Materials*, Chapter 22, by J. A. Brydson, herein incorporated by reference, for a complete description of these latter type epoxy resins.

The polyglycidyl ethers of a novolac suitable for use in accordance with this invention are prepared by reacting an epihalohydrin with phenol formaldehyde condensates. While the bisphenol A-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of novolac.

The production of the reaction is generally a massive oxidation resistant aromatic compound, one example of which is represented by the formula:

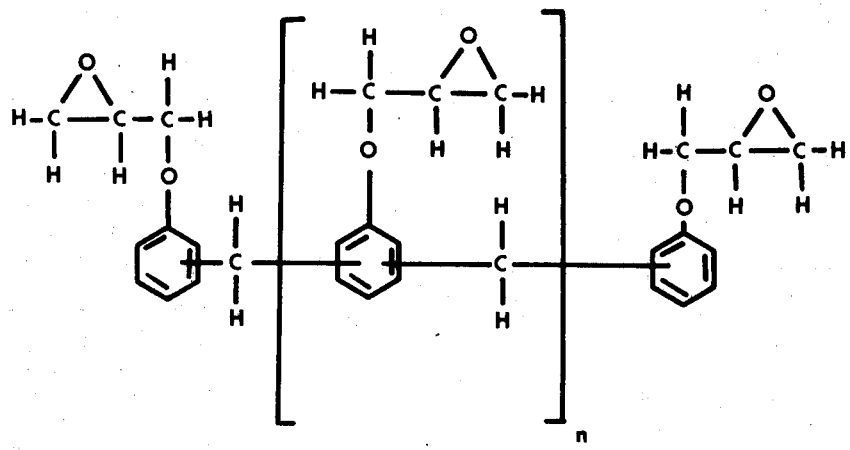

wherein $n$ is an integer of the series 0, 1, 2, 3 etc.

Although novolac resins from formaldehyde are generally preferred for use in this invention, novolac resins from any other aldehyde such as, for example, acetaldehyde, chloraldehyde, butyraldehyde, fufuraldehyde, can also be used. Although the above formula shows a completely epoxidized novolac, other novolacs which are only partially epoxidized can be useful in this invention.

The epoxy resins may be characterized by reference to their epoxy equivalent weight, which is the mean molecular weight of the particular resin divided by the mean number of epoxy units per molecule. In the present invention, the suitable epoxy resins are characterized by an epoxy equivalent weight of from about 130 to about 1200 for the bisphenol A type and from about 100 to 500 for the epoxy novolacs. Within this range there is a preferred range of epoxy equivalent weight of from about 150 to about 800 for the bisphenol A type and from about 125 to 350 for the epoxy novolacs. These two types of epoxy resins may be used alone or in admixtures in this invention. In the present invention, the suitable non-glycidyl ether epoxies are characterized by an epoxy equivalent weight of from about 75-250 for the cycloaliphatic type and from about 75-600 for the acyclic aliphatic type.

The acid anhydride curing agents which are to be used in carrying out the invention include the conventional organic mono- and poly-functional anhydrides of poly basic (carboxylic) acids i.e. at least dicarboxylic acids. Typical of the monofunctional anhydrides are hexahydrophtalic anhydride, 1-methylhexahydrophthalic anhydride, tetrahydrophthalic anhydride, 1-methyltetrahydrophthalic anhydride, phthalic anhydride, NADIC anhydride, NADIC methylanhydride and the like. Polyfunctional anhydrides which may be employed include pyromellitic dianhydride, polyazelaic polyanhydride, the reaction product of trimellitic anhydride and a glycol, and benzophenone tetracarboxylic acid dianhydride. The anhydride may be used singly or in admixture. The total anhydride content of the epoxy-anhydride mixture must lie within the range of from about 0.5 to about 1.5 anhydride equivalents for each epoxy equivalent.

For a number of purposes the unmodified epoxide resins may be considered to have certain disadvantages. These disadvantages include high viscosity, high cost and too great a rigidity for specific applications. The resins are therefore modified by incorporation of diluents, flexibilizers and fillers. Epoxy reactive diluents can be particularly useful, and may be employed up to about 70 parts of the epoxide component of the formulation of this invention, to reduce the viscosity of the mixed system, and preferably between about 20 to 50 parts of the 100 parts epoxy resin, i.e. a preferred admixture could contain, for example, 70 parts bisphenol A epoxy, 30 parts neopentyl glycol aliphatic diepoxide diluent, 4 parts of acetic acid acting as a chemical stabilizer, along with effective amounts of anhydride and latent catalyst. Reactive diluents such as phenyl glycidyl ether, butyl glycidyl ether, other alkyl glycidyl ethers, where the alkyl group contains from 5 to 12 carbons, vinyl cyclohexone dioxide, endo-dicyclopentadione dioxide, octylene oxide, and preferably diglycidyl ethers of 1,4-butanediol or neopentyl glycol diglycidyl ether can be used.

Epoxidized natural oil extenders, such as epoxidized linseed or soy bean oils, octyl epoxy tallate and reactive plasticizers such as the conventional phthalates and phosphates may also be used in small amounts, up to about 40 parts per 100 parts epoxy resin to provide increased flexibility. Thixotropic agents, such as $SiO_2$ in gel composition and pigments such as $TiO_2$ may be used as aids in fluidizing the composition or enhancing the color tones of the cured resins. Similarly, various fillers, such as silica, quartz, beryllium aluminum silicate, lithium aluminum silicate and mixtures thereof in average particle sizes from about 10 to 300 microns may be employed up to about 200 parts per 100 parts epoxy resin to improve electrical properties of the resin formulation.

The materials which were found useful as chemical stabilizers, to substantially increase the storage lifetime of the above described epoxy-anhydride-latent catalyst systems, are certain carboxylic acids when added within a critical epoxy:anhydride:carboxylic acid weight percent ratio. The useful carboxylic acids in this invention contain one carboxyl group, to provide

attached to an aliphatic alkyl group (RCOOH). The aliphatic mono-carboxylic acids which are effective to increase potlife of epoxy-anhydride-latent catalyst systems are acetic acid ($CH_3COOH$), propionic acid ($CH_3CH_2COOH$), butyric acid ($CH_3CH_2CH_2COOH$), isobutyric acid

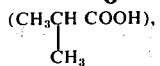

valeric acid ($CH_3(CH_2)_3COOH$), caproic acid ($CH_3(CH_2)_4COOH$), heptanoic acid (enanthic acid ($CH_3(CH_2)_5COOH$), and hexanoic acid.

These particular mono-carboxylic acids will increase the storage lifetime of latent catalyzed epoxide systems, yet still provide reasonable gel times of under about 45 minutes at 170°C, when added within the epoxy:anhydride:carboxylic acid weight percent ratio of 100:55–165:1–20. Below 1 part carboxylic acid and no increase storage life effect can be seen; above 20 parts carboxylic acid and gel time starts to become unmanageable and tensile properties of the cured resin are degraded because acid remains unreacted and acts as plasticizer. A preferred ratio would be 100:55–165:2–16. The carboxylic acid content of the epoxy admixture would be within the range of about 0.01 to 0.25 carboxylic acid equivalents for each epoxy equivalent with a preferred range between about 0.02 to 0.05.

The best results in terms of ultimate potlife occur with a combination of carboxylic acid and onium salt type latent catalyst, but improved potlife results occur with other latent catalysts, such as for example, imidazoles and amines.

Effective carboxylic acids require at least one methyl group attached to the carboxyl group. The effectiveness of the carboxylic acids as stabilizers decreases as the alkyl chain length is increased, suggesting that the active stabilization sites on the molecule are a function either of the carboxyl group or of the methyl group since both of these decrease in concentration as the alkyl chain length increases. Carboxylic acids containing olefinic double bonds or basic hydroxyl groups give decreased storage stability. Carboxylic acids containing aromatic aryl groups, or substituents such as halogens give decreased storage stability, and dicarboxylic acids also give decreased storage stability.

Electrical transformers, rectifiers and electronic components can be potted or cast within the completely reactive stabilized epoxy resin compositions of this invention. Referring to the figure of the drawing, there is illustrated a potted transformer 10 which comprises a magnetic core 12 provided with one winding 14 which comprises an electrical conductor 16 which is insulated with insulation 18 and another winding 20 which comprises a conductor 22 also insulated with insulation 24. The magnetic core 12 with its associated windings 14 and 20 disposed about the core are completely potted in the epoxide resin 26 which has been catalyzed with the latent catalyst of this invention.

EXAMPLE 1

Fifteen resin formulations were made containing 70 grams of a liquid diglycidyl ether of bisphenol A resin, having an epoxy equivalent weight of 172–176 and a viscosity at 25°C of 4000–5500 cp (sold commercially by Dow Chemical Co. under the tradename DER-332), 30 grams of diglycidyl ether of neopentyl glycol an aliphatic diepoxy diluent having an epoxy equivalent weight of about 150 and a viscosity at 25°C of 6–8 cp., 100 grams of 1-methyltetrahydrophthalic anhydride curing hardener and 0.08 grams of methyl trioctylphosphonium-dimethylphosphate as latent catalyst (to provide an epoxy resin:acid anhydride:quaternary organic phosphonium salt weight ratio of 100:100:0.08). The epoxy resin consists of 70 parts glycidyl ether of bisphenol A and 30 parts of neopentyl glycol diglycidyl ether.

To these fifteen epoxy-anhydride-catalyst batches were added separately (A) 4 grams lactic acid (alpha-hydroxy propionic acid, $CH_3CHOH\ COOH$), (B) 4 grams acrylic acid (propenoic acid, $CH_2=CHCOOH$), (C) 4 grams glycolic acid (hydroxy acetic acid, $HOCH_2COOH$), (D) 6 grams propionic acid, ($CH_3CH_2COOH$), (E) 6 grams butyric acid, ($CH_3(CH_2)_2COOH$), (F) 6 grams isobutyric acid, (G) 6 grams heptanoic acid (enanthic acid, $CH_3(CH_2)_5COOH$), (H) 6 grams hexanoic acid (caprylic acid, $CH_3(CH_2)_6COOH$), (I) 4 grams acetic acid ($CH_3COOH$), (J) 6 grams acetic acid, (K) 10 grams acetic acid, (L) 20 grams acetic acid, and (M) control sample containing no carboxylic acid acting as chemical stabilizer.

into 19 × 150 mm test tubes. These Samples were placed in a 170°C constant temperature bath and gel times of the samples recorded using a Sunshine Gel meter. The gel time was the amount of time it took the formulation to start to solidity.

To evaluate the effect of the carboxylic acids of this invention on the electrical properties of the cured resin, ⅛ inch thick castings of Samples 1(J) and 1(M) were cured in an oven using a heating cycle of 16 hours at 135°C plus 4 hours at 150°C. Then 60 Hz power factors ($100 \times \tan \delta$) and dielectric constant values were obtained at 125°C (ASTM designation D150-65T). The results of these tests are recorded below on TABLE 1. The initial viscosities of the Samples were between about 100–150 cp. at 25°C.

TABLE 1

| Sample (epoxy:anhydride: carboxylic acid) | Gel Time at 170°C (minutes) | Pot Life at 26°C | | 125°C | |
|---|---|---|---|---|---|
| | | up to 500 cp (days) | up to 1000 cp (days) | Power Factor ($100 \times \tan\delta$) | Dielectric Constant $\epsilon'$ |
| 1(A)-lactic acid (100:100:4) | — | 22 | 42 | — | — |
| 1(B)-acrylic acid (100:100:4) | — | 58 | 97 | — | — |
| 1(C)-glycolic acid (100:100:4) | — | 45 | 75 | — | — |
| 1(D)-propionic acid (100:100:6) | 23 | 73 | 109 | — | — |
| 1(E)-butyric acid (100:100:6) | 23 | 69 | 105 | — | — |
| 1(F)-isobutyric acid (100:100:6) | — | 65 | 102 | — | — |
| 1(G)-heptanoic acid (100:100:6) | — | 66 | 103 | — | — |
| 1(H)-hexanoic acid (100:100:6) | — | 62 | 99 | — | — |
| 1(I)-acetic acid (100:100:4) | 24 | 76 | 110 | — | — |
| 1(J)-acetic acid (100:100:6) | 27 | 80 | 115 | 9.8 | 6.7 |
| 1(K)-acetic acid (100:100:10) | 30 | 82 | 125 | — | — |
| 1(L)-acetic acid (100:100:20) | 41 | 90 | 130 | — | — |
| 1(M)-no carboxylic acid (control) (100:100:0) | 20 | 60 | 98 | 8.5 | 3.8 |
| 1(N)-no carboxylic acid and no latent catalyst (100:100:0) | 1000+ | — | 200+ | 4.6 | — |
| 1(O)-no anhydride (100:0:2.0) | 1500+ | — | — | — | — |

Sample (N) contained 70 grams DER-332, 30 grams of diglycidyl ether of neopentyl glycol having an epoxy equivalent weight of 150 and a viscosity at 25°C of 6–8 cp., 100 grams of 1-methyltetrahydrophthalic anhydride curing hardener, no latent catalyst and no carboxylic acid acting as chemical stabilizer. Sample (O) contained 70 grams of a liquid diglycidyl ether of bisphenol A resin, having an epoxy equivalent weight of 182–189 and a viscosity at 25°C of 7000–10,000 cp., (sold commercially by Ciba Products Co. under the tradename Araldite 6005), 30 grams of diglycidyl ether of 1,4-butylene glycol diluent having an epoxy equivalent weight of 150 and a viscosity at 25°C of 15 cp and 2 grams of tetrabutylphosphonium acetate. This provided 15 separate compositions, Samples 1(A) to 1(O).

The compositions were poured into separate containers, stirred at room temperature and then put in a paint mixer for about five minutes. Storage properties of the formulation were found by measuring viscosities at 25°C in Gardner-Holdt bubble tubes. Measurements were usually taken at one-week intervals. The termination of the catalyzed lifetime (potlife) of these formulations were considered to be when the viscosity reached a value of 1000 cp. at 26°C. Ten grams each of Samples 1(D), 1(E) and 1(I) through 1(O) were then poured These results show that propionic acid, butyric acid, isobutyric acid, heptanoic acid, hexanoic acid and acetic acid, (Samples 1(D) through 1(L)) act as effective non-catalytic chemical stabilizers, to provide improved shelf life for an epoxy-anhydride-latent catalyst system (control Sample 1(M)). When added to the control system within the epoxy:anhydride:carboxylic acid weight ratio of 100:55–165:1–20, gel times will be kept below acceptable values of about 45 minutes at 170°C, and storage life can be increased substantially (over 27 percent, with very good gel times of 30 minutes in Sample 1(K)). Samples 1(N) and 1(O) show that both anhydride and latent catalyst are necessary for a useful potting compound.

The effect of the useful carboxylic acids on the electrical properties of the cured resin system indicates acceptably low power factors and dielectric constants at 125°C (see Sample 1(J) vs. Sample 1(M)). Power factors of 9–10 percent at 125°C for these cured resins containing the carboxylic acids are substantially lower than the 15 percent values considered acceptable for high voltage insulation in high voltage electrical transformers. The epoxy-latent catalyst system used in this EXAMPLE is outstanding in terms of electrical properties, gel time and ultimate potlife.

The ineffectiveness of acrylic acid to give improved storage properties is believed to be due to the olefinic double bond. Both lactic acid and glycolic acid, Samples 1(A) and 1(C) contain basic hydroxyl groups that give decreased storage stability.

Ethylene glycol and nonylphenol, both basic compounds, were also evaluated and they have a potlife at 26°C, resin viscosity up to 100 cp., of 55 days and 85 days respectively, well below the control values of 60 and 98 days.

Other carboxylic acids that were evaluated but showed no beneficial effect on storage stability in similar epoxy-anhydride-latent catalyst systems included oxalic acid (HOOC — COOH-dicarboxylic acid), formic acid (HCOOH), trichloroacetic acid ($Cl_3C$ — COOH), trifluoro acetic acid ($F_3C$ — COOH), and pivalic acid (($CH_3)_3C$ — COOH) which reduced storage stability; and succinic acid (HOOC — $CH_2$ — COOH — dicarboxylic acid), benzoic acid ($C_6H_5$ — COOH), phenyl acetic acid ($C_6H_5CH_2$ — COOH), diphenyl acetic acid (($C_6H_5)_2CH$ — COOH), p-chlorobenzoic acid (Cl — $C_6H_5$ — COOH) and p-nitrobenzoic acid ($NO_2$ — $C_6H_5$ — COOH) which did not provide any significant change in storage stability. As can be seen, very surprisingly, only a very limited class of mono-carboxylic acids in a narrow weight range function as effective and useful storage stabilizers for latent catalyzed epoxy-anhydride systems. An evaluation indicates that the stabilization phenomenon is not a simple pH effect i.e. a liberation of protons, and only certain acids are useful epoxy-anhydride stabilizers.

EXAMPLE 2

Formulations were made to compare the effect of acetic acid, the best chemical stabilizer, to improve storage lifetime of epoxy-anhydride systems using various imidazole, amine and other onium salt latent catalysts in place of the very effective phosphonium salts. Six resin formulations were made containing 70 grams DER-322, 30 grams of diglycidyl ether of neopentyl glycol diluent having an epoxy equivalent weight of about 150 and a viscosity at 25°C of 6–8 cp. and 100 grams of 1-methyltetrahydrophthalic anhydride curing hardner.

To these six epoxy-anhydride formulations were added separately (A) 0.08 grams of benzyltrimethylammonium iodide latent catalyst, (B) 0.08 grams of benzyltrimethylammonium iodide latent catalyst and 6 grams acetic acid as chemical stabilizer, (C) 0.08 grams N,N-benzyldimethylamine as latent catalyst (D) 0.08 grams n,n-benzyldimethylamine as latent catalyst and 6 grams acetic acid as chemical stabilizer, (E) 0.08 grams 1-methylimidazole as latent catalyst and (F) 0.08 grams 1-methylimidazole as latent catalyst and 6 grams acetic acid as chemical stabilizer. This provided 6 separate compositions, Samples 2(A) to 2(F).

Storage properties of the formulations were found and measured as in EXAMPLE 1. Gel time measurements were made on 10 gram samples of catalyzed resin in 2 inch diameter dishes in a forced air oven at 150°C. The Samples were inspected every 5 minutes and the approximate gel time was considered to be the time it took the formulation to start to solidify. The results of these tests are recorded below in TABLE 2. The initial viscosities of the Samples were between about 140–175 cp. at 26°C.

TABLE 2

| Sample (epoxy:anhydride: carboxylic acid: latent catalyst) | Gel Time at 150°C (minutes) | Pot Life at 26°C | |
|---|---|---|---|
| | | Up to 500 cp (days) | Up to 1000 cp (days) |
| 2(A)-ammonium iodide (control) (100:100:0:0.08) | 45 | 42 | 78 |
| 2(B)-ammonium iodide and acetic acid (100:100:6:0.08) | 45 | 60 | 98 |
| 2(C)-dimethyl amine (control) (100:100:0:0.08) | 33 | 22 | 32 |
| 2(D)-dimethyl amine and acetic acid (100:100:6:0.08) | 30 | 31 | 48 |
| 2(E)-imidazole (control) (100:100:0:0.08) | 15 | 14 | 24 |
| 2(F)-imidazole and acetic acid (100:100:6:0.08) | 15 | 19 | 29 |

As can be seen, the phosphonium salt latent catalyst-carboxylic acid systems provide longer storage life, however, in instances where only a 1–2 month storage is required, the imidazoles, amines and ammonium salts can be used with the carboxylic acids of this invention. As can be seen, in every instance, the useful class of carboxylic acids described in this invention will provide improved shelf life to an epoxide-anhydride-latent catalyst system. For example, the addition of acetic acid improved the shelf life of Sample 2(A) by 26 percent, Sample 2(C) by 50 percent and Sample 2(E) by 21 percent. When less reactive epoxy resins, such as aliphatic epoxides are used, the storage life of the carboxylic acid stabilized systems listed in TABLE 2 will be much improved and more in line with the values attained TABLE 1.

We claim;

1. A fluid, stabilized, resinous composition suitable for insulating electrical members comprising by weight:
   A. 100 parts of an epoxy resin containing more than one 1,2 epoxy group per molecule,
   B. 55 to 165 parts of an anhydride of a polycarboxylic acid as a curing agent,
   C. 1 to 20 parts of a mono-carboxylic acid selected from the group consisting of acetic, propionic, butyric, isobutyric, valeric, caproic, and heptanoic acids acting as a stabilizer to increase storage lifetime and,
   D. an effective amount of a latent catalyst selected from the group consisting of amines, imidazoles and quaternary organic onium salts having the structural formula:

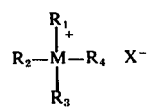

where M is selected from the group consisting of N and P, $R_1$, $R_2$, $R_3$ and $R_4$ are selected from the group consisting of alkyl and aryl radicals having 1 to 21 carbon atoms and X is selected from the group consisting of halogen, propionate, acetate, butyrate, isobutyrate and dimethyl phosphate radicals.

2. The composition of claim 1, wherein the composition contains a latent catalyst selected from the group consisting of about 0.02 to 0.70 parts quaternary organic onium salt, about 0.05 to 0.3 parts amine and about 0.05 to 0.3 parts imidazole, and has a viscosity of up to 1,000 cps at 26° C.

3. The composition of claim 1 wherein the epoxy resin comprises a resin selected from the group consisting of bisphenol A epoxy resins, novolac epoxy resins and mixtures thereof.

4. The composition of claim 3 also containing up to about 200 parts filler particles, of average particle sizes from about 10 to 300 microns, for 100 parts (A).

5. The composition of claim 3, wherein the epoxy resin contains up to about 70 parts epoxy reactive diluent.

6. The composition of claim 5 wherein the bisphenol A epoxy resin has an epoxy equivalent weight of from about 130 to 1200, the novolac epoxy resin has an epoxy equivalent weight of from about 100 to 500, the acid anhydride curing agent is selected from the group consisting of hexahydrophthalic anhydride, 1-methyl hexahydrophthalic anhydride, tetrahydrophthalic anhydride, 1-methyltetrahydrophthalic anhydride, phthalic anhydride, NADIC anhydride, NADIC methyl anhydride, pyromellitic dianhydride, polyazelaic polyanhydride, benzophenone tetracarboxylic acid dianhydride and mixtures thereof and the epoxy resin contains about 20 to 50 parts neopentyl glycol diglycidyl ether reaction diluent.

7. The combination of an electrical member and a cured body of resinous insulation applied to the member, wherein the improvement comprises the insulation comprising the cured resinous composition of claim 3.

8. The combination of an insulated electrical transformer comprising a magnetic core, electrical windings disposed about the magnetic core and having a body of cured resinous insulation applied to the electrical windings, wherein the improvement comprises the insulation comprising the cured resinous composition of claim 3.

9. A fluid, stabilized, resinous composition for insulating electrical members consisting essentially of by weight:
A. 100 parts of an epoxy resin containing more than one 1,2 epoxy group per molecule,
B. 55 to 165 parts of an anhydride of a polycarboxylic acid as a curing agent,
C. 0.02 to 0.70 parts of quaternary organic onium salt acting as a latent catalyst and having the structural formula:

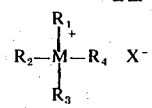

where M is selected from the group consisting of N and P, $R_1$, $R_2$, $R_3$ and $R_4$ are selected from the group consisting of alkyl and aryl radicals having 1 to 21 carbon atoms and X is selected from the group consisting of halogen, propionate, acetate, butyrate, isobutyrate and dimethyl phosphate radicals, and D. about 1 to 20 parts of a mono-carboxylic acid selected from the group consisting of acetic, propionic, butyric, isobutyric, valeric, caproic, and heptanoic acids acting as a stabilizer to increase storage lifetime.

10. The resinous composition of claim 9, wherein the epoxy resin comprises a resin selected from the group consisting of bisphenol A epoxy resins, novolac epoxy resins and mixtures thereof, said resin containing about 20 to 50 parts of at least one epoxy reactive diluent selected from the group consisting of phenyl glycidyl ether, butyl glycidyl ether, alkyl glycidyl ethers wherein the alkyl group contains from 5 to 12 carbons, vinyl cyclohexone dioxide, endodicyclopentadione dioxide, octylene oxide and neopentyl glycoldiglycidyl ether, and has a viscosity of up to 1,000 cps at 26° C.

11. The composition of claim 9 wherein the acid anhydride curing agent is selected from the group consisting of hexahydrophthalic anhydride, 1-methyl hexahydrophthalic anhydride, tetrahydrophthalic anhydride, 1-methyltetrahydrophthalic anhydride, phthalic anhydride, NADIC anhydride, NADIC methyl anhydride, pyromellitic dianhydride, polyazelaic polyanhydride, benzophenone tetracarboxylic acid dianhydride and mixtures thereof.

12. The combination of an electrical member and a cured body of resinous insulation applied to the member, wherein the improvement comprises the insulation comprising the cured resinous composition of claim 9.

13. The combination of an insulated electrical transformer comprising a magnetic core, electrical windings disposed about the magnetic core and having a body of cured resinous insulation applied to the electrical windings, wherein the improvement comprises the insulation comprising the cured resinous composition of claim 9.

* * * * *